United States Patent [19]

Surtin

[11] 4,332,414
[45] Jun. 1, 1982

[54] AUTOMOBILE WINDOW SHADE DEVICE AND METHODS OF MAKING AND USING THE SAME

[76] Inventor: Robert J. Surtin, 10266 Halls Ferry Rd., St. Louis, Mo. 63136

[21] Appl. No.: 135,885

[22] Filed: Mar. 31, 1980

Related U.S. Application Data

[63] Continuation-in-part of Ser. No. 888,192, Mar. 20, 1978, abandoned, and a continuation-in-part of Ser. No. 126,302, Mar. 3, 1980.

[51] Int. Cl.³ .............................................. B60J 3/00
[52] U.S. Cl. ................................ 296/97 D; 296/97 G
[58] Field of Search ............... 296/97 R, 97 D, 97 G, 296/97 H

[56] References Cited

U.S. PATENT DOCUMENTS

| | | | |
|---|---|---|---|
| 1,510,984 | 10/1924 | Dorsey | 296/97 G |
| 1,613,364 | 1/1927 | Thompson | 296/97 G |
| 2,519,222 | 8/1950 | Brooks | 296/97 D |
| 2,560,762 | 7/1951 | Ghegan | 296/97 E |
| 3,003,812 | 10/1961 | Haugland | 296/97 E |
| 3,021,173 | 2/1962 | Levin | 296/97 G |

Primary Examiner—Joseph F. Peters, Jr.
Assistant Examiner—John A. Carroll
Attorney, Agent, or Firm—Gravely, Lieder & Woodruff

[57] ABSTRACT

The present invention relates to an automobile window shade device wherein a plurality of elongated members are pivotally joined together proximate one end thereof and disposed in stacked relationship to each other and further provided with a joinder tape which passes through and is secured to each member intermediate its ends and a mounting bracket operably mounted to the elongated members. The tape retains the members in fixed predetermined open relationship.

2 Claims, 7 Drawing Figures

AUTOMOBILE WINDOW SHADE DEVICE AND METHODS OF MAKING AND USING THE SAME

REFERENCE TO PRIOR APPLICATIONS

This application is a Continuation-In-Part of prior copending application of Robert J. Surtin, Ser. No. 888,192, filed Mar. 20, 1978 entitled AUTOMOBILE WINDOW SHADE DEVICE AND METHODS OF MAKING AND USING THE SAME (now abandoned), and copending application of Robert J. Surtin, Ser. No. 126,302 filed Mar. 3, 1980 entitled AUTOMOBILE WINDOW SHADE DEVICE AND METHODS OF MAKING AND USING THE SAME.

BACKGROUND OF THE INVENTION

Owners of automobiles having long experienced the intense heat contained in their automobile after the automobile has been parked for an extended period of time during periods of high sunlight.

In addition to the uncomfortable atmosphere the heat presents to the occupant, this heat also draws additional energy from the car's cooling system. Further, the direct rays of the sun along with the heat tend to shorten the life span of the materials used on the interior of the automobile.

Solutions have been proposed, such as those shown in Levin U.S. Pat. No. 3,021,173 and Dorsey 1,510,984. However, these have not proven successful and the present invention obviates the problems inherent in these structures.

SUMMARY OF THE INVENTION

It is therefore an object of the present invention to provide an automobile window shade device which comprises a plurality of elongated members pivotally mounted together proximate one end and disposed in stacked relationship to each other and provided with a binder tape which limits the rotation of the members and a mounting bracket secured to the members. The binder tape acts to position and locate the slats in fixed relationship to each other as well as to provide a means for opening and closing the shade device.

An object of the present invention is to provide such a device which can be mounted proximate a window of an automobile and when opened it shades the glass area and car interior.

A further object of the present invention is to provide such a device which will provide a reflecting surface shielding the glass area and car interior.

A further object of the present invention is to provide such a device which is simply and economically manufactured and used.

These together with other objects and advantages which will become subsequently apparent, reside in the details and construction and operation as more fully hereinafter described and claimed, reference being had to the accompanying drawings forming a part hereof, wherein like numerals refer to like parts throughout, and in which;

DETAILED DESCRIPTION OF THE INVENTION

Figure 1:
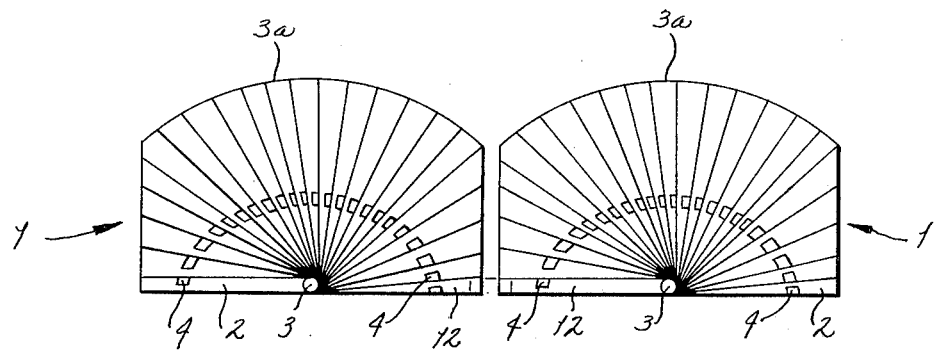
FIG. 1 is an elevational view of an automobile window shade device constructed in accordance with and embodying the present invention.

Referring now in more detail and by reference characters to the drawings which illustrate practical embodiments of the present invention, FIG. 1, is an elevational view of an automobile window shade device 1 constructed in accordance with, used in and embodying the present invention.

As shown in FIG. 1, the shade device 1 includes a plurality of elongated members or slats 2 pivotally secured together at one end 3 and provided with joinder tape 4 disposed in apertures 20, 21, 22, and 23 in the members 2. The apertures 20, 21, 22, and 23 are positioned in the body of the slats 2 between the pivoted ends 3 and the free ends 3a.

The slots 20, 21, 22, and 23 are parallel and elongated and extend in the lengthwise direction of the slats 2. Each slat 2 is provided with four slots 20, 21, 22, and 23 which are critically spaced in relation to each other and to the sides of the slats 2. As may be seen in FIGS. 6 and 7, adjacent slats 2 are designed to overlap each other to provide complete coverage in repelling the sun.

The slots 20, 21, 22, and 23 are arranged such that a series of three substantially equally spaced slots 20, 21, and 22 are positioned adjacent to one edge 2a of the slat 2. Assuming the slat to have a width of "C", the three slots 20, 21, and 22 are formed in a group "A" such that the farthestmost slot edge is "⅜C" from the edge 2a. The length "D" of each slot 20, 21, 22, and 23 is about "¼C" or ¼ of the width. The distance "B" of the fourth slot 23 is about ⅜C from the edge 2a. This disposition of slots 20, 21, 22, and 23 allows the tape 4 to be secured to each slat 2 and to position adjacent slats 2 in overlapping relationships.

Figure 6:
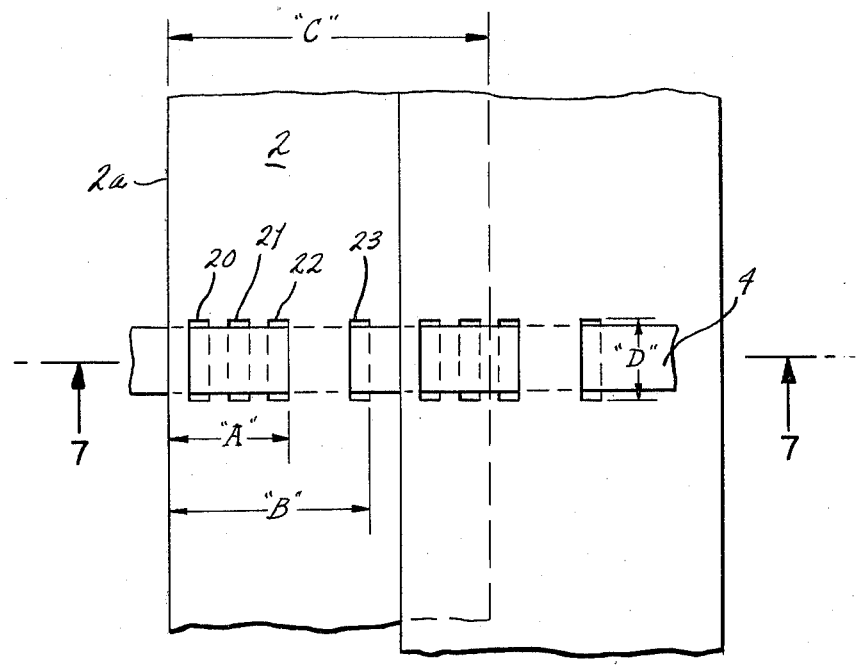
FIG. 6 is a fragmentary plan view partly in detail of members used in the device in FIG. 1.
Figure 7:
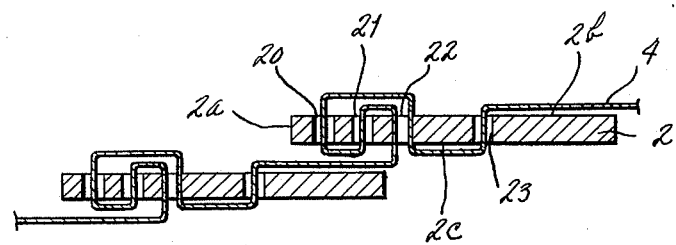
FIG. 7 is a sectional view taken along line 7—7 of FIG. 6.

The positioning and width of the tape, which is slightly less than the length of the slots 20, 21, 22, and 23, are critical to the proper location of the slats 2. As seen in FIGS. 6 and 7, the tape 2 passes over the slat top 2b, through the most remote opening 23, along the slat undersurface 2c, through the next slot 22, over the intermediate slot 21 and down through the first slot 2d, where it returns and passes up through the intermediate slot 21, over the slot top surface 2b into the third slot 23 adjacent to itself and then turns along the slat undersurface 2c toward the first opening 20, passing over itself as it moves toward the next adjacent slat 2, where it again enters the most remote opening 23 and the foregoing process is repeated.

This locks the tape 4 to the slats 2 and also determines the most open position of the slats 2.

Figure 2:
FIG. 2 is a partial elevational view of the members used in the device in FIG. 1.
Figure 3:
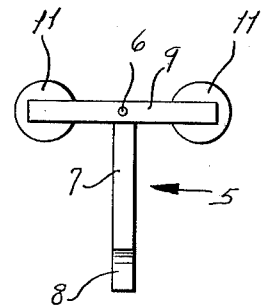
FIG. 3 is an elevational view of a bracket used on the device shown in FIG. 1 constructed in accordance with and embodying the present invention.
Figure 5:
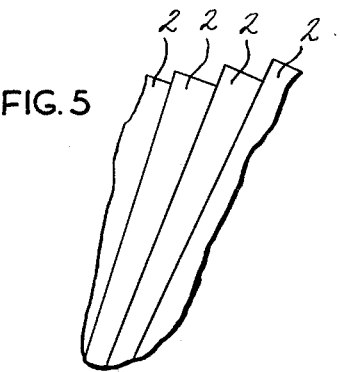
FIG. 5 is another partial elevational view of the members used in the device in FIG. 1.
Figure 4:
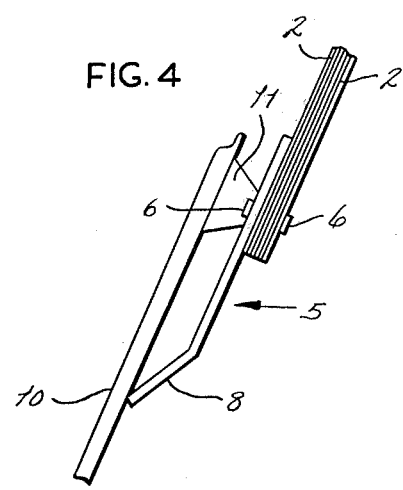
FIG. 4 is a fragmentary side elevational view showing the device positioned on an automobile window.

FIG. 2 illustrates the stacked relationship and shape of the individual member 2. FIG. 3 and FIG. 4 illustrate a bracket 5, which is mounted to the members 2 at the pivot point 3 and its relationship to the members 2. In the bracket embodiment shown, the bracket consists of a fastener 6 which pivotally secures the slat members 2 to a brace member 7, the lower end 8 of which braces against the car window or dash board 10 and to a securing arm 9. The arm 9 is provided with suction cups 11 which hold the device 1 proximate the window 10.

The device 1 is collapsible, i.e., the members 2 may be closed much like a fan until they form a stack. At the desired time the stack is spread fan-like to cover the window area. The members 2 are joined together by the joinder tape 4 which by its mounting and disposition relative to the members 2 as shown in FIGS. 6 and 7 and hereinbefore described, determines the ultimate movement of the members 2 and the fan shape of device 1 when opened.

It should be understood that changes and modifications in the form, construction, arrangement, and combination of the automobile window shade device and methods of making and using the same may be made and substituted for those herein shown and described without departing from the nature and principle of my invention.

If desired, the opposed first slat members 12 may be elongated and secured together by a suitable bracket (not shown) to further stabilize the shade device 1 on the windshield.

What I claim is:

1. An automobile window shade comprising:
   a. bracket means for positioning said shade between the windshield and the dash of said automobile,
   b. a plurality of substantially flat elongated members pivotally mounted to said bracket means proximate one end of said members, said members disposed in stacked relationship to each other, said flat elongated members having essentially uniform width and being manually openable to about 180° to form a shade having about one-half circle in shape, said members each being provided with a series of lengthwise slots located intermediate the pivoted end and a free end,
   c. a joinder tape operably mounted to said members and secured thereto and disposed within said apertures in said members to provide means for fanning said members into an open position and for retaining said members in overlapped open position,
   d. each said member being provided with four apertures, the first three apertures being equally spaced in a group adjacent to one longitudinal edge of the member and the fourth is spaced from the group across the width of the member, all of said apertures being disposed in a row across the width of the member and said joinder tape is disposed in said apertures such that said joinder tape passes from a first side of said member, through the fourth aperture to the second side of said member, through the next adjacent aperture to the first side and then skipping the next successive aperture through the first aperture to the second side and then through the second aperture to the first side and through the third aperture to the second side and to the first side of the next adjacent elongated member.

2. An automobile window shade as described in claim 1 wherein the said aperture in each member are essentially rectangular in shape and have a length slightly larger than the width of said joinder tape and have a width sufficient to accommodate at least two thicknesses of said joinder tape, said apertures being located across the width of said member such that three apertures are substantially equally spaced adjacent to one longitudinal edge of said member across about $\frac{3}{8}$ of the width of said member and the fourth aperture is spaced from said first three and is located about $\frac{5}{8}$ of the width of said member from said one longitudinal edge thereof, the tape overlaying itself as it passes through said three equally spaced apertures.

* * * * *